Figure 1:
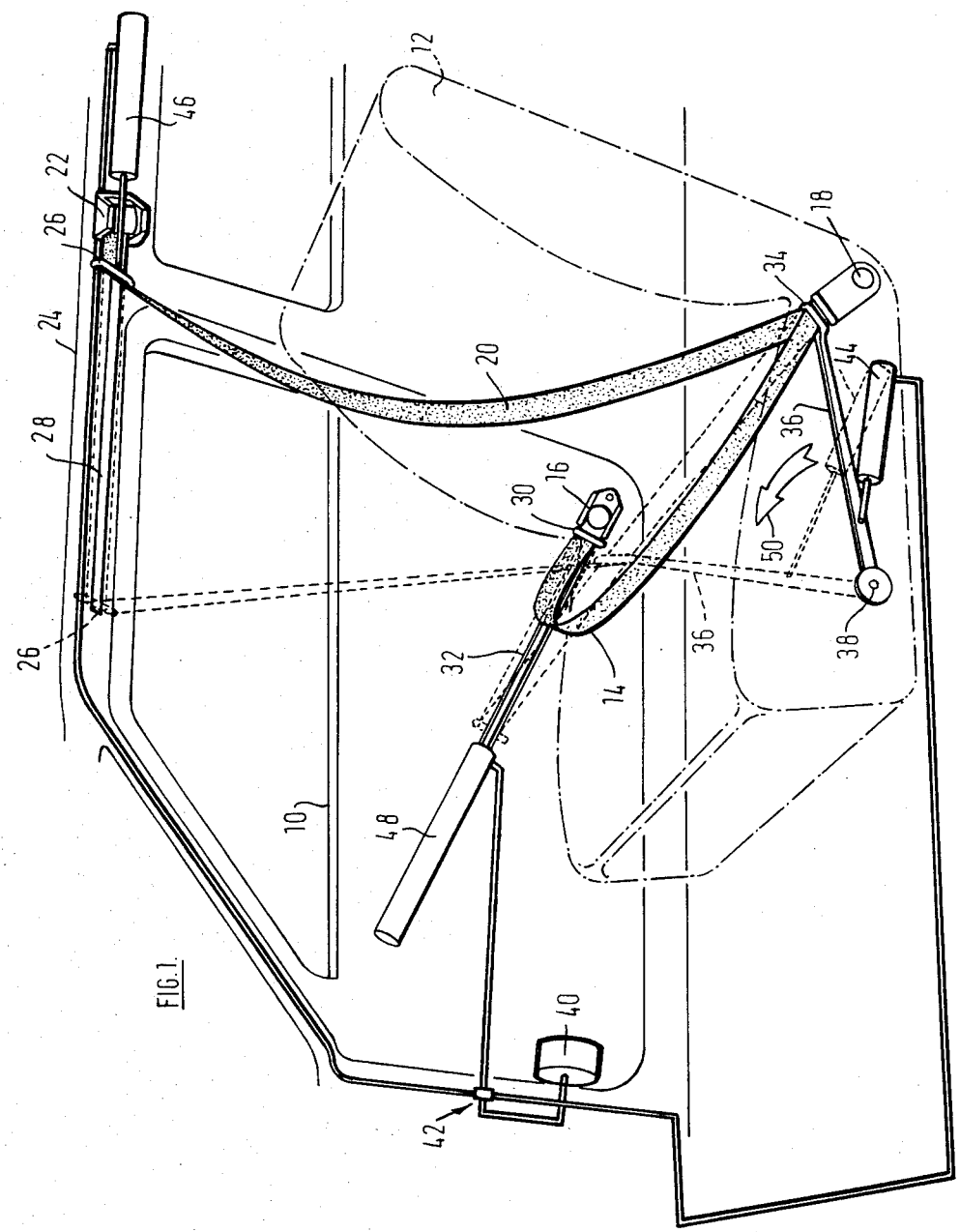

United States Patent [19]
Else

[11] Patent Number: 4,542,919
[45] Date of Patent: Sep. 24, 1985

[54] PASSIVE SAFETY BELT SYSTEM

[75] Inventor: Robert F. Else, Lock Heath, Nr. Southampton, England

[73] Assignee: Britax (Wingard) Limited, United Kingdom

[21] Appl. No.: 523,729

[22] Filed: Aug. 16, 1983

[30] Foreign Application Priority Data

Sep. 4, 1982 [GB] United Kingdom ............... 8225251

[51] Int. Cl.⁴ ............................................. B60K 21/10
[52] U.S. Cl. ................................................. 280/804
[58] Field of Search ....................... 280/802, 803, 804

[56] References Cited

U.S. PATENT DOCUMENTS 3,882,955  5/1975  Kaneko et al. ...................... 280/804
4,213,637  7/1980  Mauron .............................. 280/802

FOREIGN PATENT DOCUMENTS 2404771   8/1975  Fed. Rep. of Germany ...... 280/804
2713172  10/1978  Fed. Rep. of Germany ...... 280/804
2738000   3/1979  Fed. Rep. of Germany ...... 280/804

Primary Examiner—Joseph F. Peters, Jr.
Assistant Examiner—Kenneth R. Rice
Attorney, Agent, or Firm—Hayes, Davis & Soloway

[57] ABSTRACT

In a passive safety belt system for a motor vehicle, the belt is moved away from the body of the user when the corresponding vehicle door is opened. A master piston-and-cylinder unit is connected between the door and the vehicle body so as to respond to opening and closing movements of the door. Slave piston-and-cylinder units having a smaller bore and larger stroke than the master piston-and-cylinder unit, are connected to the master piston-and-cylinder unit so that a relatively short displacement of the piston of the latter causes a longer displacement of the piston of the former. Each slave piston-and-cylinder unit connected to the safety belt adjacent to a respective anchorage and arranged to displace the safety belt forwardly away from the seat as the door is opened.

9 Claims, 4 Drawing Figures

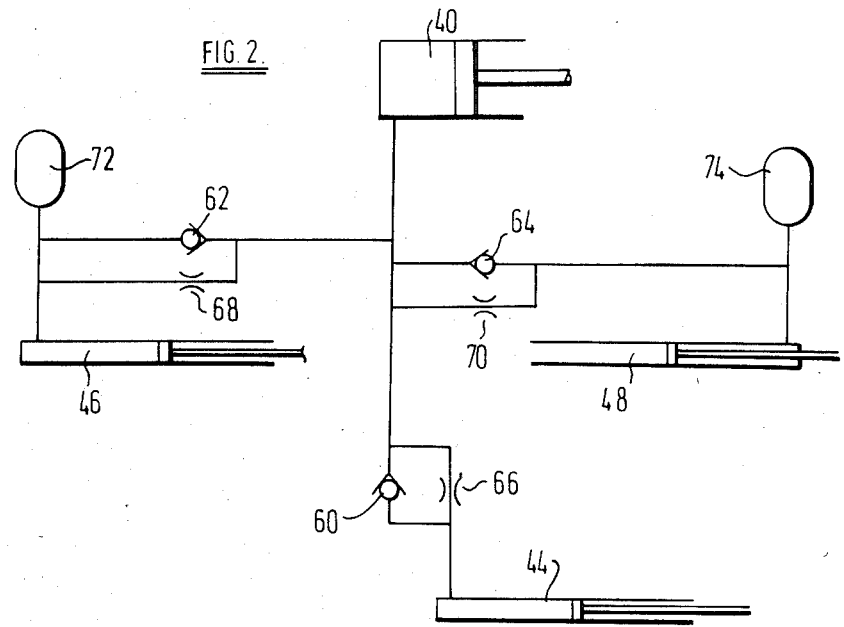
FIG. 2.
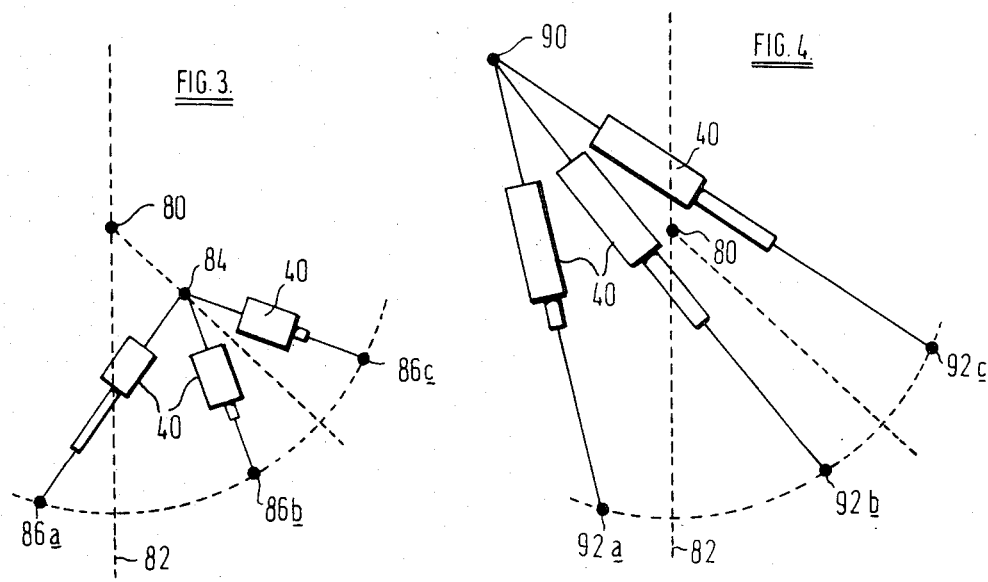
FIG. 3.
FIG. 4.

PASSIVE SAFETY BELT SYSTEM

This invention relates to a passive safety belt system for a motor vehicle of the type in which the belt is moved away from the body of the user when the corresponding vehicle door is opened.

It is an object of the present invention to provide a system of the foregoing type in which the power used to move the safety belt is derived from the opening and closing movement of the vehicle door.

U.S. Pat. Nos. 4,416,468 and 4,416,469 disclose systems of this type in which the connection between the vehicle door and the safety belt is mechanical. However, such systems are highly dependant on the "geometry" of the particular vehicle and it is difficult to ensure that adequate movement of the safety belt system is achieved when the vehicle door is only partially opened, as would be the case when space is restricted, for example in a congested carpark.

According to the present invention, a motor vehicle has a seat adjacent to a door, the seat being provided with a safety belt, a master piston-and-cylinder unit connected between the door and the vehicle body so that opening and closing movements of the door cause displacement of fluid therein, a slave piston-and-cylinder unit, having a smaller bore and larger stroke than the master piston-and-cylinder unit, fluidically connected to the master piston-and-cylinder unit so that a relatively short displacement of the piston of the latter causes a longer displacement of the piston of the former, the slave piston-and-cylinder unit being connected to the safety belt adjacent to one of the anchorages thereof and arranged to displace the safety belt forwardly away from the seat as the adjacent door is opened.

Preferably a respective slave piston-and-cylinder unit is provided for each anchorage of the safety belt. More than one slave unit may be driven from a single master unit, fluidic restrictors and accumulators being used to control the relative timing.

Preferably the location of the connection of the master piston-and-cylinder unit to the vehicle body relative to the door hinge pivot axis is such that the piston-and-cylinder unit passes through a dead-centre position between the half open and fully open position of the door. The effect of this is that a relatively large fluid displacement takes place during the initial door opening movement while relatively little fluid displacement takes place as the door moves from its half open to its fully open position.

It will usually be preferable for the fluidic system to be hydraulic but a pneumatic system can be provided as an alternative.

Embodiments of the invention will now be described, by way of example, with reference to the accompanying drawings, in which:

FIG. 1 is a schematic prospective view of part of the interior of a motor vehicle fitted with a safety belt system in accordance with the invention, FIG. 2 is a circuit diagram of the hydraulic circuit of the system shown in FIG. 1, FIG. 3 is a schematic diagram illustrating the geometry of the master cylinder of the system shown in FIGS. 1 and 2, and FIG. 4 is a schematic diagram, similar to FIGS. 3, showing an alternative pivot geometry.

FIG. 1 shows part of the interior of a motor car having a door 10 with an adjacent seat 12 fitted with a safety belt system in accordance with the invention. The safety belt system comprises a conventional three-point safety belt having a lap strap 14 extending between a retractor 16 mounted near the bottom rear corner of the vehicle door and an anchorage 18 mounted on the inboard side of the seat 12 adjacent to the bottom of the seat back. A shoulder strap 20 runs between the anchorage 18 and a retractor 22 mounted on the cantrial 24 above and behind the opening for the door 10.

Immediately after it emerges from the retractor 22, the shoulder strap 20 is led through a guide loop 26 mounted on a slider which runs along a track 28 mounted on the cantrail 24. Similarly, immediately after it emerges from the retractor 16, the lap strap is led through a guide loop 30 mounted on a track which runs diagonally forward and upwardly on the inside of the vehicle door. Before they are attached to the anchorage 18, both the lap strap 14 and the shoulder strap 20 are led through a guide loop 34 which is secured to the free end of an arm 36 mounted for pivotal movement about a stub-axle 38 projecting from the inner side of the seat 12.

A master hydraulic piston-and-cylinder unit 40 is connected between the door 10 and an adjacent point on the vehicle body so that, as the door 10 is opened, the piston is forced into the cylinder. The master piston-and-cylinder unit 40 is connected by a hydraulic circuit, indicated generally at 42, to three slave hydraulic piston-and-cylinder units 44, 46 and 48. The piston-and-cylinder unit 44 is arranged to pivot the arm 36 from its normal position, shown in solid lines, to the position shown in dotted lines, as indicated by the arrow 50. The piston-and-cylinder unit 46 is arranged to displace the slider 26 forwardly along the track 28 on the cantrail while the piston-and-cylinder unit 48 is arranged to displace the guide loop 30 along the track 32 on the vehicle door. The master piston-and-cylinder unit 40 is of relatively large diameter and short stroke while the three slave piston-and-cylinder units 44, 46 and 48 are of relatively small diameter and long stroke, with the result that a small opening movement of the door 10 causes a large displacement of the guide loops 26, 30 and 34. As can be seen from FIG. 1, when the door opens and the pistons of the three slave units 44, 46 and 48 are displaced to their maximum extent, both the lap strap 14 and the shoulder strap 20 are held well clear of the seat 12, permitting easy entry and egress from the vehicle by a seat occupant.

Turning now to FIG. 2, respective non-return valves 60, 62 and 64, each connected in parallel with a respective restrictor 66, 68 and 70, are connected in the supply pipe to each of the three slave cylinders 44, 46 and 48. The non-return valves 60, 62 and 64 are connected so as to permit hydraulic fluid to enter the corresponding slave cylinders 44, 46 and 48 rapidly while the restrictors 66, 68 and 70 retard escape of hydraulic fluid therefrom. The result is that, although the full hydraulic pressure is immediately to cause displacement of the lap and shoulder straps 14 and 20 away from the seat occupant as the door is opened, they return to retain the seat occupant relatively slowly as the door is closed. In addition, respective accumulators 72 and 74 are connected to the pipes feeding the cylinders 46 and 48 so as to delay operation of these cylinders, which cause displacement of those parts of the straps 14 and 20 closest to the retractors 16 and 22, until after the arm 36 has completed its movement. This reduces the extent of frictional wear on the clothing of the seat occupant. It will be apparent that alternative combinations of non-return valves, restrictors and accumulators can be used to provide different operating characteristics.

Turning now to FIG. 3, the hinge axis of the door 10 is represented by the point 80 and the longitudinal orientation of the opening for the door in the car body is indicated by the line 82. As can be seen, the point 84 of pivotal attachment of the master piston-and-cylinder unit 40 to the vehicle body is outside the line 82. The point 86 of pivotal attachment of the unit 40 to the door 10 is indicated at location 86a when the door is closed, at location 86b when the door is half open and at location 86c when the door is fully open. As the door opens to cause the pivot point 86 to move from the location 86a to the location 86b, a relatively large displacement of the piston relative to the cylinder takes place. On the other hand, as the door opens to move the pivot point 86 between the locations 86b and 86c, the unit 40 goes through a dead-centre and no net displacement of the piston relative to the cylinder results. The consequence is that the straps 14 and 20 are moved substantially completely to their forward position during the first half of the opening movement of the vehicle door.

FIG. 4 indicates an alternative geometry for the connection of the piston-and-cylinder to the door which does not require the point of pivotal attachment of the piston-and-cylinder unit 40 to the vehicle body to be outside the line of the door opening. In FIG. 4, this point of pivotal attachment 90 is inboard and in front of the hinge axis 80 of the door instead of being outboard of and behind it. When the door is closed, the position of the point 92 at which the unit 40 is attached to the door 10 is at the location 92a and, as the door moves to its half open position, this point moves to the location 92b and then to the location 92c as the door is opened fully. As with the configuration illustrated in FIG. 3, the unit 40 goes through a dead-centre between the position 92b and 92c. However, the piston is withdrawn from the cylinder as the point 92 moves from the position 92a to the position 92b, with the result that a negative pressure is created in the hydraulic system as the door opens instead of a positive pressure. This requires all the connections to the slave cylinders to be reversed and, in addition, care must be taken to avoid the formation of a vacuum in the hydraulic system which would result in there being insufficient force to reliably overcome the re-wind springs of the retractors 16 and 22. However, either the geometry illustrated in FIG. 3 or the geometry illustrated in FIG. 4 may be used without such problems if the various single acting piston-and-cylinder units 40, 44, 46 and 48 are replaced by double acting units.

I claim:

1. A motor vehicle having a seat adjacent to a door, the seat being provided with a safety belt, a master piston-and-cylinder unit connected between the door and the vehicle body so that opening and closing movements of the door cause displacement of fluid therein, the location of the connection of the master piston-and-cylinder unit to the vehicle body relative to the door hinge pivot axis being such that the master piston-and-cylinder unit passes through a dead-center position between the half open and fully open positions of the door, a slave piston-and-cylinder unit, having smaller bore and larger stroke than the master piston-and-cylinder unit, fluidically connected to the master piston and cylinder so that a relatively short displacement of the piston of the latter causes a longer displacement of the piston of the former, the slave piston-and-cylinder unit being connected to the safety belt adjacent to one of the anchorages thereof and arranged to displace the safety belt forwardly away from the seat as the adjacent door is opened.

2. A vehicle according to claim 1, wherein a respective slave piston-and-cylinder unit is provided for each anchorage of the safety belt.

3. A vehicle according to claim 2, wherein the slave piston-and-cylinder units are all driven from a single master piston-and-cylinder unit, a fluidic restrictor and accumulator forming part of the connection between the master unit and at least one of the slave units.

4. A vehicle according to claim 1, wherein the connection of the master piston-and-cylinder unit to the vehicle body is in front of and inboard of the door hinge axis.

5. A vehicle according to claim 4, wherein a non-return valve is connected in parallel with the restrictor so as to allow fluid flow therethrough during opening movements of the door.

6. A vehicle according to claim 1, wherein the point of attachment of the master piston-and-cylinder unit to a vehicle body is behind and outboard of the door hinge axis.

7. A vehicle according to claim 1, wherein the location of the connection of the master piston-and-cylinder unit to the vehicle body relative to the door hinge pivot axis is such that the master piston-and-cylinder unit passes through a dead-centre position between the half open and fully open positions of the door.

8. A vehicle according to claim 7, wherein the connection of the master-piston-and-cylinder unit to the vehicle body is in front of and inboard of the door hinge axis.

9. A vehicle according to claim 7, wherein the point of attachment of the master piston-and-cylinder unit to a vehicle body is behind and outboard of the door hinge axis.

* * * * *